US011544618B2

(12) United States Patent
Qu et al.

(10) Patent No.: US 11,544,618 B2
(45) Date of Patent: Jan. 3, 2023

(54) AUTOMATIC MULTI-THRESHOLD FEATURE FILTERING METHOD AND APPARATUS

(71) Applicant: Alibaba Group Holding Limited, Grand Cayman (KY)

(72) Inventors: Shenquan Qu, Hangzhou (CN); Jun Zhou, Hangzhou (CN); Yongming Ding, Hangzhou (CN)

(73) Assignee: Alibaba Group Holding Limited, George Town (KY)

(*) Notice: Subject to any disclaimer, the term of this patent is extended or adjusted under 35 U.S.C. 154(b) by 1147 days.

(21) Appl. No.: 16/132,264

(22) Filed: Sep. 14, 2018

(65) Prior Publication Data
US 2019/0042982 A1    Feb. 7, 2019

Related U.S. Application Data

(63) Continuation of application No. PCT/CN2017/075517, filed on Mar. 3, 2017.

(30) Foreign Application Priority Data

Mar. 17, 2016 (CN) .......................... 201610154296.1

(51) Int. Cl.
*G06F 16/00* (2019.01)
*G06N 20/00* (2019.01)
(Continued)

(52) U.S. Cl.
CPC ......... *G06N 20/00* (2019.01); *G06F 16/9535* (2019.01); *G06K 9/623* (2013.01)

(58) Field of Classification Search
CPC .... G06N 20/00; G06F 16/9535; G06K 9/623; G06Q 30/0241
See application file for complete search history.

(56) References Cited

U.S. PATENT DOCUMENTS 8,682,095 B2 * 3/2014 Lee .................... G06V 10/28
                                                         382/172
9,275,347 B1   3/2016 Harada et al.
(Continued)

FOREIGN PATENT DOCUMENTS

CN     1851729 A    10/2006
CN   102629305 A     8/2012
(Continued)

OTHER PUBLICATIONS

Mark A. Hall, "Correlation-based Feature Selection for Machine Learning", pp. 1-198 (Year: 1999).*

(Continued)

*Primary Examiner* — Jared M Bibbee
(74) *Attorney, Agent, or Firm* — Lee & Hayes, P.C.

(57) ABSTRACT

An automatic multi-threshold feature filtering method and an apparatus thereof are provided. In an iterative process of training a machine learning model, the feature filtering method calculates a feature filtering threshold and feature correlation values of a current round of iteration based on a result of a previous iteration, and performs feature filtering on samples based on the calculated feature filtering threshold and the calculated feature correlation values. The feature filtering apparatus of the present disclosure includes a calculation module and a feature filtering module. The method and apparatus of the present disclosure can automatically generate different feature filtering thresholds at each iteration, which greatly improves an accuracy of a filtering threshold, and can greatly increase the training speed of automatic machine learning and an accuracy of a machine learning model compared with fixed and single thresholds nowadays.

20 Claims, 2 Drawing Sheets

(51) Int. Cl.
  *G06K 9/62* (2022.01)
  *G06F 16/9535* (2019.01)

(56) References Cited

U.S. PATENT DOCUMENTS

| | | | |
|---|---|---|---|
| 2005/0281457 A1* | 12/2005 | Dundar | G06K 9/6231 |
| | | | 382/159 |
| 2015/0206069 A1 | 7/2015 | Beers et al. | |
| 2015/0379425 A1 | 12/2015 | Dirac et al. | |
| 2018/0293516 A1* | 10/2018 | Lavid Ben Lulu | G07C 3/00 |

FOREIGN PATENT DOCUMENTS

| | | |
|---|---|---|
| CN | 103955714 A | 7/2014 |
| CN | 104504373 A | 4/2015 |
| CN | 104616031 A | 5/2015 |
| CN | 105389480 A | 3/2016 |
| JP | 2010039778 A | 2/2010 |
| JP | 2014160457 A | 9/2014 |

OTHER PUBLICATIONS

International Search Report dated Jun. 1, 2017, from corresponding PCT Application No. PCT/CN2017/075517, 2 pages.
Taki, et al., "Variable Selection Method Suitable for man-hour Estimation Based on Project Similarity", IPSJ Journal, IPSJ, Jul. 15, 2008, vol. 49, Issue 7, pp. 2338-2348, Internet: <URL: http://id.nii.ac.jp/1001/00009493/>.
International Search Report dated Jun. 1, 2017, from corresponding PCT Application No. PCT/CN2017/075517, 5 pages.
Yang, "Research on Feature Selection Approach and its Application in Network Traffic Identification", Electronic Technology & Information Science, China Master's Theses Full-Text Database, No. 7, Jul. 15, 2012 (Jul. 15, 2012), ISSN: 1674-0246, 69 pages.
Machine translated Chinese First Office Action for CN Application No. 201610154296.1, dated Jan. 6, 2020, 8 pages.
Machine translated Chinese Second Office Action for CN Application No. 201610154296.1, dated Jun. 12, 2020, 10 pages.
Search Report for Application No. 201610154296.1, dated Dec. 25, 2019, 2 pages.

* cited by examiner

AUTOMATIC MULTI-THRESHOLD FEATURE FILTERING METHOD AND APPARATUS

CROSS REFERENCE TO RELATED PATENT APPLICATIONS

This application claims priority to and is a continuation of PCT Patent Application No. PCT/CN2017/075517 filed on 3 Mar. 2017, and is related to and claims priority to Chinese Patent Application No. 201610154296.1, filed on 17 Mar. 2016, entitled "Automatic Multi-Threshold Feature Filtering Method and Apparatus," which are hereby incorporated by reference in their entirety.

TECHNICAL FIELD

The present application relates to the technical field of artificial intelligence technologies, and particularly to automatic multi-threshold feature filtering methods and apparatuses.

BACKGROUND

A ultra large-scale machine learning algorithm is a basic technical support for current Internet companies to implement systems such as search query ranking, Internet advertisement click rate prediction, product personalized recommendation, speech recognition, and intelligent answering to questions, etc. The ever-expanding data scale has improved the effectiveness of algorithmic applications, and also brought great theoretical and engineering challenges to large-scale data processing at the same time. Highly efficient data processing has become the core technology of the Internet big data applications.

Internet data is usually very sparse. Therefore, after training a machine learning model using the Internet data, a sparse model is obtained, and the sparse model facilitates subsequent storage and prediction. The use of highly efficient feature filtering algorithms in the extremely sparse Internet data training can effectively remove irrelevant features and redundant features, improving the performance of generalization and the operating efficiency of learning algorithms, and being a great help to training machine learning models.

The large-scale data that the Internet companies use to train machine learning models is generally composed of a number of sample data. Each sample is formed by a fixed number of feature sets. An example is given as follows:

Sample features: {feature_1, feature_2, . . . , feature_n}

Since features of the Internet big data samples are very sparse and most of the features are zero, certain mechanisms can be applied to filter out certain features from participating in subsequent model training. This will greatly enhance the training efficiency of a machine learning model.

Existing feature filtering methods usually perform filtering by manually setting a fixed threshold. For example:

Set a fixed filter threshold r;

Calculate a gradient g based on sample data;

Calculate a value x based on a gradient value gi in a certain dimension and other model parameters, compare sizes of x and r, and filter features in that dimension if x is smaller than r.

As can be seen, a threshold that is used for filtering in existing feature filtering methods needs to be manually specified. Therefore, the effect of filtering is strongly dependent on human experience, and the filtering effect is unstable because the threshold of filtering cannot be automatically adjusted according to sample data, resulting in a reduction in an accuracy of model prediction obtained through training. Furthermore, there is only one threshold which is fixed and cannot be adjusted dynamically based on training conditions, thus failing to filter all features well. Since a value of the threshold is not well determined, a machine learning model obtained by training will be unreliable and the accuracy of prediction will be reduced if the threshold is not selected properly.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Objectives of the present disclosure include providing an automatic multi-threshold feature filtering method and an apparatus thereof, so as to solve feature filtering methods of existing technologies, which can only perform feature filtering using a fixed threshold value, resulting in the problems of inefficient training and inaccurate machine learning models obtained through training.

In order to achieve the above objectives, technical solutions of the present disclosure are given as follows.

An automatic multi-threshold feature filtering method for performing feature filtering on sample data during training of a machine learning model, the feature filtering method including calculating a feature filtering threshold and feature correlation values of a current round of iteration based on a result of a previous round of iteration; and performing feature filtering for samples based on the feature filtering threshold and the feature correlation values that are calculated.

Furthermore, the feature filtering threshold may be a ratio between a maximum gradient among gradients obtained for various dimensional features in sample data in the previous round of iteration and an amount of sample data.

Furthermore, calculating the feature correlation values of the current round of iteration based on the result of the previous round of iteration includes calculating a gradient of each dimensional feature of the sample data of the current round of iteration based on the result of the previous round of iteration; and calculating a corresponding feature correlation value according to the gradient of each dimensional feature.

Furthermore, the feature correlation value of each dimensional feature is a linear function of a gradient associated with a respective dimension.

Furthermore, performing feature filtering for the samples based on the feature filtering threshold and the feature correlation values that are calculated includes filtering a respective dimensional feature from participating in a calculation of subsequent iterations if a correlation value of the respective dimensional feature is smaller than a feature filtering threshold of a respective dimension, or retaining the respective dimensional feature for continuing the calculation of the subsequent iteration otherwise.

The present disclosure also proposes an automatic multi-threshold feature filtering apparatus for performing feature filtering on sample data during training of a machine learning model. The feature filtering apparatus includes a calculation module configured to calculate a feature filtering threshold and feature correlation values of a current round of iteration based on a result of a previous round of iteration; a feature filtering module configured to perform feature filtering for samples based on the feature filtering threshold and the feature correlation values that are calculated.

Furthermore, the feature filtering threshold is a ratio between a maximum gradient among gradients obtained for various dimensional features in sample data in the previous round of iteration and an amount of sample data.

Furthermore, when the calculation module calculates the feature correlation values of the current round of iteration based on the result of the previous round of iteration, the following operations are performed: calculating a gradient of each dimensional feature of the sample data of the current round of iteration based on the result of the previous round of iteration; and calculating a corresponding feature correlation value according to the gradient of each dimensional feature.

Furthermore, the feature correlation value of each dimensional feature is a linear function of a gradient associated with a respective dimension.

Furthermore, the feature filtering module performs feature filtering or the samples based on the feature filtering threshold and the feature correlation values that are calculated, and performs the following operations: filtering a respective dimensional feature from participating in a calculation of subsequent iterations if a correlation value of the respective dimensional feature is smaller than a feature filtering threshold of a respective dimension, or retaining the respective dimensional feature for continuing the calculation of the subsequent iteration otherwise.

The present disclosure proposes an automatic multi-threshold feature filtering method and an apparatus thereof, which make a breakthrough of existing manual settings of a single threshold for feature filtering, and are able to automatically calculate multiple thresholds to filter features according to an iterative result of each batch of sample data. This greatly improves the speed of training and the accuracy of a machine learning model obtained through the training.

DETAILED DESCRIPTION

Technical solutions of the present disclosure are described in detail hereinafter with reference to accompanying drawings and embodiments. The following embodiments are in no way intended to limit the present disclosure.

The Internet service has a large amount of raw user data. For example, in order to increase a click rate and an accuracy of product recommendation in advertisement clicking and product recommendation service, a machine learning model is trained using a large amount of raw sample data. Sample data has multi-dimensional features, such as a price, a commodity category, etc. These features have different effects on improvement. Some features may have no effect on improvement. These features may be filtered out, while effective features are retained. These retained features finally get different weights through training. These weights are model parameters corresponding to a machine learning model that is obtained. In a process of training a machine learning model, model parameters corresponding to the machine learning model need to be obtained through continuous iterative calculations. A general idea of the present disclosure is to calculate feature filtering values based on current model parameters each iteration of training of a machine learning model, and to perform feature filtering using the calculated feature filtering values.

Figure 1:
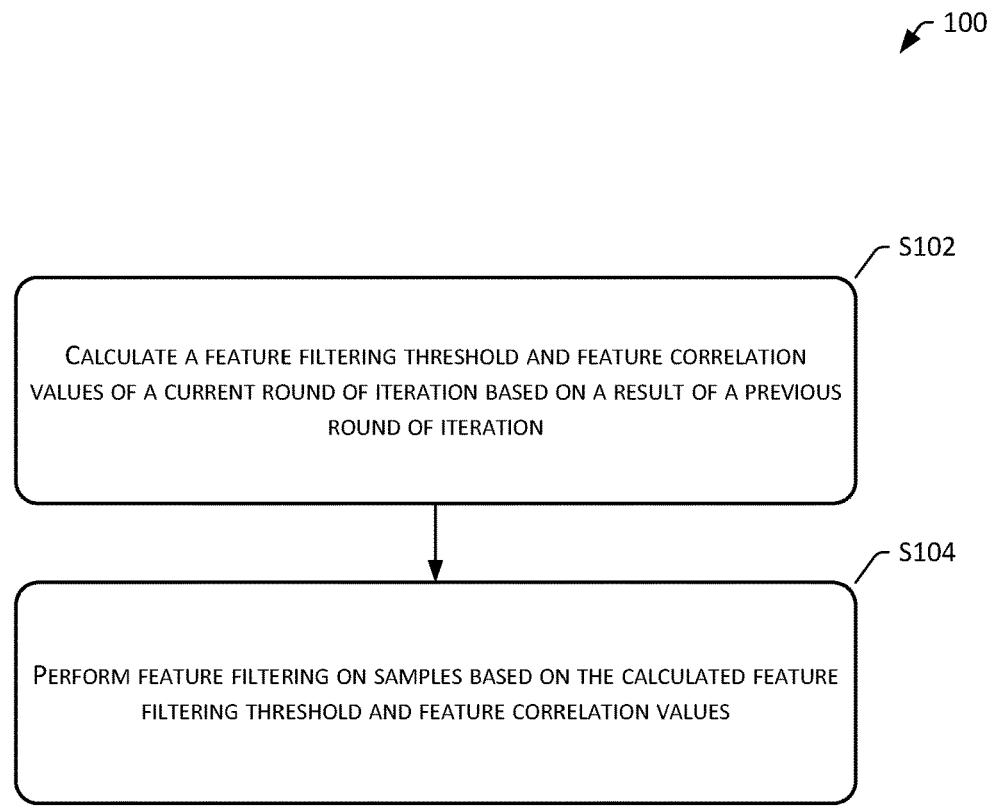
FIG. 1 is a flowchart of an automatic multi-threshold feature filtering method according to the present disclosure.

As shown in FIG. 1, an automatic multi-threshold feature filtering method 100 of the present embodiment includes the following operations.

Operation S102: Calculate a feature filtering threshold and feature correlation values of a current round of iteration based on a result of a previous round of iteration.

The present embodiment uses a typical process of machine learning as an example. An estimation function of a machine learning model is assumed to be:

$$h_\theta(x)=\theta_0+\theta_1 x_1+ \ldots +\theta_n x_n \qquad \text{Equation 1}$$

where $\theta$ is a model parameter and x is a sample feature, which are both vectors. $x_i$ is an $i^{th}$ dimensional feature.

In machine learning, a loss function is also defined to evaluate whether $\theta$ is better, and $\theta$ is adjusted to obtain a minimum value of $J(\theta)$. To achieve this goal, iterations are needed to be performed according to a least-squares method or a gradient descent method until convergence that finally takes a value of $\theta$ to minimize $J(\theta)$.

In implementations, a gradient descent method is used as an example. An equation for calculating a $k^{th}$ round of a gradient $g_k$ is given as follows:

$$g_k=\partial J(\theta)/\partial \theta_{k-1} \qquad \text{Equation 2}$$

A training process of a machine learning model and a gradient descent method are not repeated herein. The present embodiment uses an iterative result of the above process to calculate feature filtering thresholds. Details of a calculation method are given as follows:

Assume that a feature filtering threshold of a $k^{th}$ round is $r_k$:

$$r_k = \frac{\max g_{(k-1)i}}{l} \qquad \text{Equation 3}$$

l is the number of samples, and $g_{(k-1)i}$ is a gradient value corresponding to an $i^{th}$ dimensional feature of a k–$1^{th}$ round.

It should be noted that the present embodiment calculates feature filtering thresholds $r_k$ based on a sample size l of raw sample data and a gradient $g_{ki}$ and such calculation can be implemented by a variety of algorithms rather than depending on a particular algorithm. For example, the calculation may be performed according to the gradient $g_k$ and dimensions of sample features, or may be calculated according to the gradient $g_k$ and saliency parameters of the sample features, which are not exhaustively described herein.

Similarly, the present embodiment also needs to calculate a feature correlation value $s_{ki}$ corresponding to an $i^{th}$ feature of the $k^{th}$ round. A calculation equation is given as follows:

$$s_{ki}=g_{ki}+\delta \qquad \text{Equation 4}$$

where $\delta$ is a fixed constant. As can be seen, a feature filtering threshold $r_k$ of the present embodiment are calculated based on a gradient $g_{(k-1)i}$ of a previous iteration, and a feature correlation value is calculated according to a gradient $g_k$ of a current round. A feature correlation value of each dimensional feature is a linear function of a gradient of each dimension.

For this purpose, a gradient $g_k$ of a current round of iteration needs to be calculated first according to Equation 2, and a calculation of the gradient is not repeated herein. In the first round of iteration, no feature filtering is performed because no previous gradient data of a previous round exists.

It should be noted that calculation parameters of feature filtering thresholds and feature correlation values in the present embodiment need to be unified. In other words, if feature filtering thresholds are calculated according to gradients, feature correlation values are also calculated according to the gradients. However, specific calculation equations can be designed differently according to different training models, and even training of a same model can also be designed differently. For example, in a Logistic Regression (LR) model training, a KKT method of a fixed threshold filtering feature, an equation for calculating a correlation value is: $s_i = g_i + \delta$. A difference of feature correlation values of the present embodiment from this is that different feature correlation values are calculated for each round of iteration. The present disclosure is not limited to specific methods of calculating feature filtering thresholds and feature correlation values.

Operation S104: Perform feature filtering on samples based on the calculated feature filtering threshold and feature correlation values.

At operation S102, feature filtering thresholds and feature correlation values have been calculated. At this operation, features are filtered by comparing magnitudes of a feature filtering threshold $r_k$ and a feature correlation value $s_{ki}$. Specifically:

If $s_{ki}$ is less than $r_k$, the $i^{th}$ dimensional feature is filtered out and does not participate in subsequent calculations. Otherwise, the $i^{th}$ dimensional feature is retained and continues to participate in subsequent calculations.

After feature filtering, some dimensions of the raw sample data are filtered out, and the filtered data is inputted into the system as new sample data for a next round of iteration until an iterative termination condition is reached.

It should be noted that a feature filtering threshold $r_k$ and a feature correlation value $s_{ki}$ of each dimensional feature of sample data are related to a gradient $g_{ki}$, the gradient $g_{ki}$ is calculated based on the sample data, a loss function and model parameters, and the sample data and the model parameters in each round of iteration are different. Therefore, the feature filtering threshold and the feature correlation value $s_{ki}$ of each dimensional feature of the sample data that are calculated in each round of iteration are different.

It is easy to understand that more and more invalid features are filtered out as the number of iterations increases, and a feature filtering threshold that is calculated in each round of iteration becomes more accurate, which will greatly increase the speed of training.

A termination condition for iterative calculations is determined according to a specific algorithm. For examples are no new features being filtered out after a previous round of iteration, or the number of iterations exceeding a set maximum value, which are not exhaustively described herein. Features that are retained after iterations are completed will finally get different model parameters through training. Based on these model parameters, a machine learning model is obtained.

Figure 2:
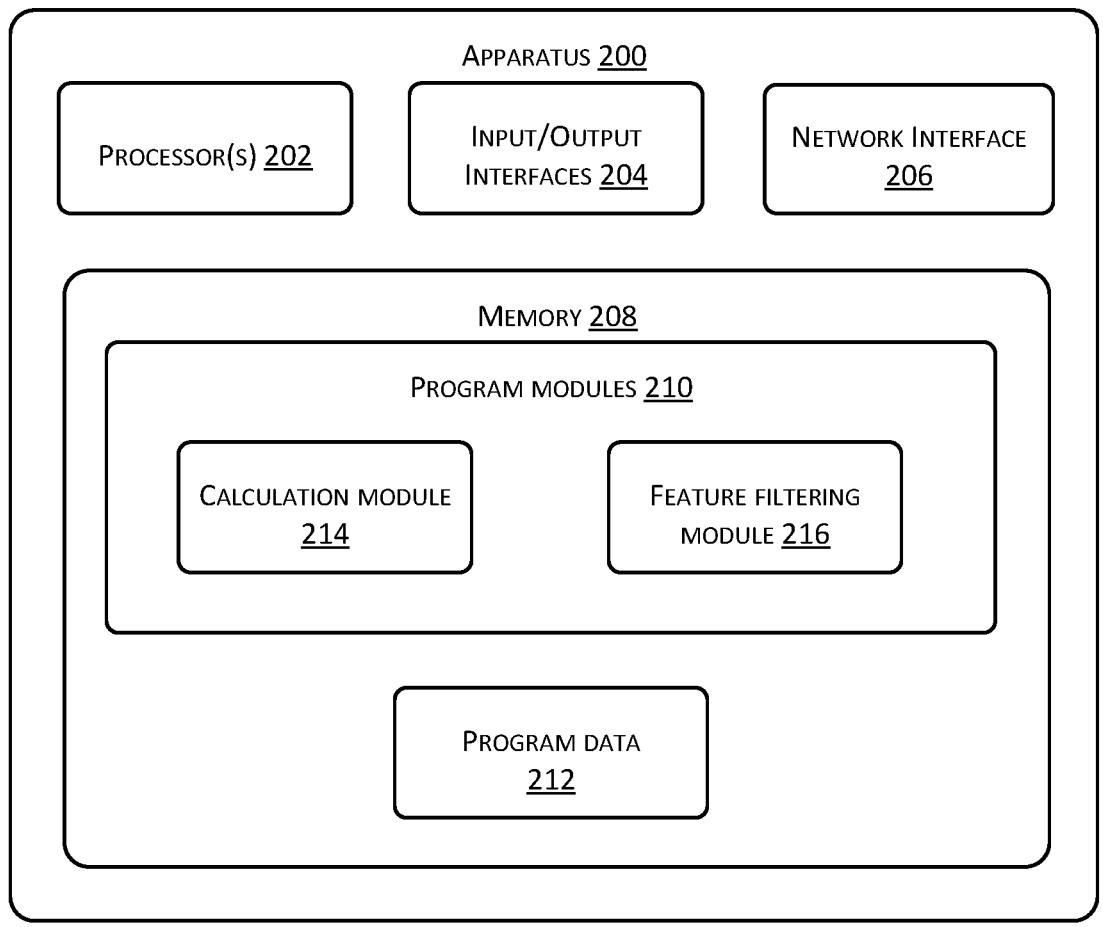
FIG. 2 is a schematic structural diagram of an automatic multi-threshold feature filtering apparatus according to the present disclosure.

As shown in FIG. 2, corresponding to the foregoing method, the present embodiment also proposes an automatic multi-threshold feature filtering apparatus 200 for performing feature filtering on sample data during training of a machine learning model. In implementations, the apparatus 200 may include one or more computing devices. In implementations, the apparatus 200 may be a part of one or more computing devices, e.g., implemented or run by the one or more computing devices. In implementations, the one or more computing devices may be located in a single place or distributed among a plurality of network devices over a network.

In implementations, the apparatus 200 may also include one or more processors 202, an input/output (I/O) interface 204, a network interface 206, and memory 208.

The memory 208 may include a form of computer readable media such as a volatile memory, a random access memory (RAM) and/or a non-volatile memory, for example, a read-only memory (ROM) or a flash RAM. The memory 208 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 208 may include program modules 210 and program data 212. The program modules 210 may include a calculation module 214 configured to calculate a feature filtering threshold and feature correlation values of a current round of iteration based on a result of a previous round of iteration; and a feature filtering module 216 configured to filter features of samples according to the feature filtering threshold and the feature correlation values that are calculated.

In implementations, the feature filtering threshold is a ratio between a maximum gradient among gradients obtained for various dimensional features in sample data in the previous round of iteration and an amount of sample data. The calculation module 214 calculates the feature correlation values of the current round of iteration based on the result of the previous round of iteration. When calculating the feature correlation values of the current round of iteration based on the result of the previous round of iteration, the calculation module 214 calculates a gradient of each dimensional feature of the sample data of the current round of iteration based on the result of the previous round of iteration, and calculates a corresponding feature correlation value according to the gradient of each dimensional feature.

A feature correlation value $s_{ki}$ corresponding to the $i^{th}$ dimensional feature of the $k^{th}$ round in the present embodiment is calculated according to Equation 4, and a feature correlation value of each dimensional feature is a linear function of a gradient of a respective dimension.

In implementations, the feature filtering module 216 performs feature filtering or the samples based on the feature filtering threshold and the feature correlation values that are calculated, and performs the following operations: filtering a respective dimensional feature from participating in a calculation of subsequent iterations if a correlation value of the respective dimensional feature is smaller than a feature filtering threshold of the respective dimension, or retaining the respective dimensional feature for continuing the calculation of the subsequent iteration otherwise.

The above embodiments are merely used to illustrate the technical solutions of the present disclosure but not to limit the same. Without departing from the spirit and essence of the present disclosure, one skilled in the art can make various corresponding changes according to the present disclosure. However, these corresponding changes and modifications should fall within the scope of protection of the appended claims of the present disclosure.

What is claimed is:

1. An automatic multi-threshold feature filtering method for performing feature filtering on sample data during training of a machine learning model, the automatic multi-threshold feature filtering method comprising:
   calculating a feature filtering threshold and feature correlation values of a current round of iteration based on a result of a previous round of iteration; and
   performing feature filtering for samples based on the feature filtering threshold and the feature correlation values that are calculated, wherein different filtering thresholds are dynamically calculated and used for different rounds of iterations.

2. The automatic multi-threshold feature filtering method of claim 1, wherein the feature filtering threshold is a ratio between a maximum gradient among gradients obtained for various dimensional features in the sample data in the previous round of iteration and an amount of sample data.

3. The automatic multi-threshold feature filtering method of claim 2, wherein calculating the feature correlation values of the current round of iteration based on the result of the previous round of iteration comprises:
   calculating a gradient of each dimensional feature of the sample data of the current round of iteration based on the result of the previous round of iteration; and
   calculating a corresponding feature correlation value according to the gradient of each dimensional feature.

4. The automatic multi-threshold feature filtering method of claim 3, wherein the feature correlation value of each dimensional feature is a linear function of a gradient associated with a respective dimension.

5. The automatic multi-threshold feature filtering method of claim 1, wherein performing the feature filtering for the samples based on the feature filtering threshold and the feature correlation values that are calculated comprises:
   filtering a respective dimensional feature from participating in a calculation of subsequent iterations if a correlation value of the respective dimensional feature is smaller than a feature filtering threshold of a respective dimension; or
   retaining the respective dimensional feature for continuing the calculation of the subsequent iteration otherwise.

6. The automatic multi-threshold feature filtering method of claim 1, wherein the feature filtering threshold of the current round of iteration is different from a feature filtering threshold of the previous round of iteration.

7. The automatic multi-threshold feature filtering method of claim 1, wherein the feature filtering threshold and the feature correlation values are calculated further based on gradients of a plurality of dimensions associated with the samples.

8. One or more computer readable media storing executable instructions that, when executed by one or more processors, cause the one or more processors to perform an automatic multi-threshold feature filtering method for performing feature filtering on sample data during training of a machine learning model, the automatic multi-threshold feature filtering method comprising:
   calculating a feature filtering threshold and feature correlation values of a current round of iteration based on a result of a previous round of iteration; and
   performing feature filtering for samples based on the feature filtering threshold and the feature correlation values that are calculated, wherein different filtering thresholds are dynamically calculated and used for different rounds of iterations.

9. The one or more computer readable media of claim 8, wherein the feature filtering threshold is a ratio between a maximum gradient among gradients obtained for various dimensional features in the sample data in the previous round of iteration and an amount of sample data.

10. The one or more computer readable media of claim 9, wherein calculating the feature correlation values of the current round of iteration based on the result of the previous round of iteration comprises:
    calculating a gradient of each dimensional feature of the sample data of the current round of iteration based on the result of the previous round of iteration; and
    calculating a corresponding feature correlation value according to the gradient of each dimensional feature.

11. The one or more computer readable media of claim 10, wherein the feature correlation value of each dimensional feature is a linear function of a gradient associated with a respective dimension.

12. The one or more computer readable media of claim 8, wherein performing the feature filtering for the samples based on the feature filtering threshold and the feature correlation values that are calculated comprises:
    filtering a respective dimensional feature from participating in a calculation of subsequent iterations if a correlation value of the respective dimensional feature is smaller than a feature filtering threshold of a respective dimension; or
    retaining the respective dimensional feature for continuing the calculation of the subsequent iteration otherwise.

13. The one or more computer readable media of claim 8, wherein the feature filtering threshold of the current round of iteration is different from a feature filtering threshold of the previous round of iteration.

14. The one or more computer readable media of claim 8, wherein the feature filtering threshold and the feature correlation values are calculated further based on gradients of a plurality of dimensions associated with the samples.

15. An automatic multi-threshold feature filtering apparatus for performing feature filtering on sample data during training of a machine learning model, the automatic multi-threshold feature filtering apparatus comprising:
    one or more processors;
    memory;
    a calculation module stored in the memory and executable by the one or more processors to calculate a feature filtering threshold and feature correlation values of a current round of iteration based on a result of a previous round of iteration; and a feature filtering module stored in the memory and executable by the one or more processors to perform feature filtering for samples based on the feature filtering threshold and the feature correlation values that are calculated, wherein different filtering thresholds are dynamically calculated and used for different rounds of iterations.

16. The automatic multi-threshold feature filtering apparatus of claim 15, wherein the feature filtering threshold is a ratio between a maximum gradient among gradients obtained for various dimensional features in the sample data in the previous round of iteration and an amount of sample data.

17. The automatic multi-threshold feature filtering apparatus of claim 16, wherein when the calculation module calculates the feature correlation values of the current round of iteration based on the result of the previous round of iteration by:

calculating a gradient of each dimensional feature of the sample data of the current round of iteration based on the result of the previous round of iteration; and calculating a corresponding feature correlation value according to the gradient of each dimensional feature.

18. The automatic multi-threshold feature filtering apparatus of claim 17, wherein the feature correlation value of each dimensional feature is a linear function of a gradient associated with a respective dimension.

19. The automatic multi-threshold feature filtering apparatus of claim 15, wherein the feature filtering module is further configured to:

filter a respective dimensional feature from participating in a calculation of subsequent iterations if a correlation value of the respective dimensional feature is smaller than a feature filtering threshold of a respective dimension, or retain the respective dimensional feature for continuing the calculation of the subsequent iteration otherwise.

20. The automatic multi-threshold feature filtering apparatus of claim 15, wherein the feature filtering threshold of the current round of iteration is different from a feature filtering threshold of the previous round of iteration.

* * * * *